(12) United States Patent
Ronin

(10) Patent No.: US 6,241,816 B1
(45) Date of Patent: Jun. 5, 2001

(54) METHOD OF TREATING CEMENT CLINKER

(76) Inventor: Vladimir Ronin, Skomakargatan 46, S-972 41 Luleå (SE)

( * ) Notice: Subject to any disclaimer, the term of this patent is extended or adjusted under 35 U.S.C. 154(b) by 0 days.

(21) Appl. No.: 09/381,481

(22) PCT Filed: Mar. 23, 1998

(86) PCT No.: PCT/SE98/00529

§ 371 Date: Sep. 21, 1999

§ 102(e) Date: Sep. 21, 1999

(87) PCT Pub. No.: WO98/42629

PCT Pub. Date: Oct. 1, 1998

(30) Foreign Application Priority Data

Mar. 26, 1997 (SE) .................................................. 9701129

(51) Int. Cl.⁷ .................................................. C04B 14/00
(52) U.S. Cl. .......................... 106/735; 106/739; 106/757
(58) Field of Search .................................... 106/735, 739, 106/757

(56) References Cited

U.S. PATENT DOCUMENTS 3,689,294 * 9/1972 Braunauer .
4,464,201 * 8/1984 Pairon .
5,125,976 * 6/1992 Skvara et al. ........................ 106/724

FOREIGN PATENT DOCUMENTS

0081861A1 6/1983 (EP) .
0081861B1 9/1984 (EP) .
WO 94/00403 1/1994 (WO) .

OTHER PUBLICATIONS

Derwent Abstract No. 92–257352/31, week 9231, Abstract of SU 1675255 A1, Cement Milling Method, (Belgorod Constr Materials Techn), Sep. 7, 1991.

* cited by examiner

*Primary Examiner*—Paul Marcantoni
(74) *Attorney, Agent, or Firm*—Alfred J. Mangels

(57) ABSTRACT

A method of treating cement clinker by grinding the clinker in a tubular mill while charging water, gypsum, and, optionally, also a water-reduction agent to the mill at the same time. The water has a pH of from about 9 to about 13. A microfill agent and/or a water-reduction agent is mixed with said the high pH-value water to form a slurry, which is added to the clinker during the grinding process together with microfill agent and/or water-reduction agent in a dry state. The high pH value of the water can be obtained by electrolysis.

16 Claims, No Drawings

METHOD OF TREATING CEMENT CLINKER

BACKGROUND OF THE INVENTION

1. Field of the Invention

The present invention relates to a method of treating cement clinker and more specifically to a method of treating cement clinker in the process of grinding the same.

2. Description of the Related Art

The cement clinker to which the invention relates is preferably Portland cement clinker, although it is not restricted to Portland cement clinker, but can be applied with other cement clinkers.

The nearest prior art is described in European Patent Application EP 0 081 861 and in Publication WO 94/00403, which teach methods of grinding Portland cement clinker with mineral additives and an organic water reduction agent. According to the last-mentioned publication, water is also added to the last mill chamber with the intention of adjusting temperature.

As a result of the physical and chemical adsorption of molecules of water-reduction agent on the clinker particles, the resultant ground cement will have a reduced water requirement and also greater strength in comparison with standard Portland cement. One decisive drawback with this method is the difficulty in controlling the extent of the reaction between Portland clinker and water reduction agent, this reaction having a direct influence on the instability of the properties of the final cement.

The same reduction in water requirement can also be achieved by adding a water reduction agent directly to concrete with water, in accordance with conventional methods. No appreciable increase in the chemical reactivity of Portland clinker can be achieved with these methods.

SUMMARY OF THE INVENTION

The present invention relates to a method of treating cement clinker whilst grinding the clinker and adding different substances thereto, in order to enhance the strength properties of the cement produced.

The present invention thus relates to a method of treating cement clinker, by grinding the clinker in a tubular mill whilst adding water and gypsum and possibly also a water reduction agent, wherein the method is characterized by injecting water that has a pH of approximately 9–13 into the mill during grinding of the clinkers.

DESCRIPTION OF THE PREFERRED EMBODIMENTS

The invention will now be described in more detail with reference to various embodiments thereof.

Cement clinker is normally processed by first heating the clinker or calcine in a kiln at a temperature of 900–1450° C., such as to form the compounds 3 $CaO$ $SiO_2$, 2 $CaO$ $SiO_2$, 3 $CaO$ $Al_2O_3$ and 4 $CaO$ $Al_2O_3$ $SiO_2$. This treatment process results in normal Portland cement.

In a second stage, the clinker is ground together with gypsum to particle sizes of between 10–20 micrometers, in a tubular mill that includes steel balls. Water is added during this grinding process. The present invention relates to this second stage.

According to the present invention, the water has a pH of about 9–13 and is injected into the mill during grinding of the clinkers.

According to one very preferred embodiment of the invention, the water injected has been brought to this pH-value by means of electrolysis.

$OH^-$-ions are thus injected into the mill. These ions constitute highly reactive radicals that fasten to the surfaces of the non-hydrated cement particles, and facilitate formation of the complex $qCaO.mSiO_2.nH_2O$. This complex is formed on the surfaces of the cement particles.

Grinding of the clinker in the tubular mill will thus result in a dry product that contains cement particles which have a diameter of 10–20 micrometers, these particles being prehydrated insomuch that their surfaces are covered, either completely or partially, with a prehydrated coating that includes said complex.

Because the particles are prehydrated, they are very reactive. Adsorption of $OH^-$-radicals on the surfaces of the clinker particles results in said complex-building and activation by virtue of the formation of a film of hydrosilicates on the particles. This complex acts as a nucleant for subsequent reaction with water. In combination, this results in a significant improvement in the strength development of cement paste and a reduced porosity, as will be evident from the following examples.

According to one preferred embodiment, a microfill agent and/or a water-reduction agent is/are added during the grinding process.

According to one highly preferred embodiment of the invention, part of the microfill agent and/or the water-reduction agent are mixed with said water of high pH-value to form a slurry which is injected into the mill during the grinding process, while adding dry microfill agent and/or water-reduction agent during the grinding process.

It is preferred that the water-reduction agent is slurried and that this slurry is brought to said pH-value by electrolysis, prior to injecting the slurry into the mill.

The ratio between the dry substance/substances and the slurry will preferably lie in a range of between 95 weight %/5 weight % to 85 weight %/15 weight %.

The liquid phase of the slurry will preferably exceed 50% of the weight of the slurry.

According to another preferred embodiment, microfill agent in the form of $SiO_2$-containing substances, such as blast furnace slag and limestone, are delivered to the tubular mill in a quantity of up to 80% of the combined weight of microfill agent, water-reduction agent and water delivered to the mill.

According to another preferred embodiment, water-reduction agent in the form of polymers, such as lignosulfonate-based polymers that contain naphthalene or melamine or combinations thereof, are delivered to the tubular mill in an amount of up to 5% of the combined weight of microfill agent, water-reduction agent and water delivered to the mill.

A number of examples will now be described. The Table that follows the examples sets forth the results obtained with respect to water requirement, compression strength and porosity.

EXAMPLE 1

Portland cement clinker having the chemical composition in weight % $C_3S$=64.5, $C_2S$=11.0, $C_3A$=9.5, $C_4AF$=9.0, $Na_2O$=0.10 and $K_2O$=0.25 was charged to a tubular mill. The letter C in this composition is an abbreviation of CaO, A is an abbreviation of $Al_2O_3$ and F is an abbreviation of $Fe_2O_3$. The tubular mill measured 1.5 m in diameter and 3.5 m in length. Gypsum was charged together with the Portland cement clinker in an amount corresponding to 3% of the weight of the clinker, together with non-distilled water taken from the normal water supply system. This water had been subjected to electrolysis in a direct current field having an amperage of 1.75 $A/dm^2$ and a voltage of 380 V for two minutes, so as to obtain a pH-value of 11.2. The water was delivered to the tubular mill in a dispersed form. The cement produced had a specific surface area (Blaine) of 4800 $cm^2/g$.

The cement thus obtained was mixed with water in a Hobart mixer for three minutes, to obtain a cement paste of standard consistency. The cement paste was poured into a cubic steel mould having sides 20 mm in height, and compacted on a vibration table. The cement paste sample was cured in water at 20° C. and then subjected to compression tests.

EXAMPLE 2

A Portland cement clinker according to that described in Example 1 was ground in a traditional manner and a cement paste sample was produced in accordance with Example 1 above.

EXAMPLE 3

A Portland cement clinker corresponding to the clinker defined in Example 1 was ground in accordance with Example 1 together with pre-ground limestone as a microfill agent, said limestone having a specific surface area (Blaine) of 3000 $cm^2/g$. The total weight of the pre-ground limestone corresponded to 15 weight % of the weight of the cement and was charged in two different states, namely 80% in a solid, dry state and 20% in a state slurried with 35% water.

The liquid phase of the slurry comprised tap water that had been electrolyzed with 3.5 $A/dm^2$ and 380 V over a period of two minutes, to obtain a pH of 11.5.

The slurry was charged to the tubular mill in a dispersed state. The slurry was charged to the mill together with clinker, gypsum and the dry microfill agent. The cement produced had a specific surface area (Blaine) of 4780 $cm^2/g$.

Cement paste samples were produced in the manner described in Example 1.

EXAMPLE 4

Portland cement clinker and a limestone microfill were ground traditionally in the same quantities as those in Example 3, with solely the microfill being added in a dry state. The cement produced had a specific surface area (Blaine) of 4813 $cm^2/g$.

Cement paste samples were produced in the manner described in Example 1.

EXAMPLE 5

The procedure followed in this example was the same as that used in Example 1, but with the exception that in this case a liquidizing agent was added to the system. The liquidizing agent was in the form of a 40%-solution of a melamine type superplasticizing agent, namely Flyt 92® produced by Cementa AB, Sweden. The liquidizing agent was added in an amount corresponding to one weight % of the total mill charge.

The liquidizing agent was added to the liquid phase of the slurry prior to subjecting the same to electrolysis.

Cement paste samples were produced in accordance with FIG. 1.

EXAMPLE 6

The procedure followed in this example was the same as that used in Example 2, i.e. traditional grinding, but with the exception that the liquidizing agent according to Example 5 was added with water in a conventional manner in the same quantity as that in Example 5, during casting of the cement paste.

Cement paste samples were produced in the manner described in Example 1.

EXAMPLE 7

The procedure followed in this example was the same as that followed in Example 1. The cement paste obtained was then treated in accordance with the method described in International Patent Publication No. WO94/25411 (PCT/SE94/00389), wherein the cement paste was treated in a vibratory mill having a vibration circle of 10 mm in diameter and operating at a frequency of 110 r.p.m., over a period of thirty minutes. The weight ratio of grinding media to mixture was 9:1.

Cement paste samples were produced in accordance with Example 1.

EXAMPLE 8

The procedure followed in this example was the same as that followed in Example 2. The cement paste obtained was then treated in accordance with the method described in International Patent Publication No. WO94/25411 (PCT/SE94/00389); see Example 7 above.

TABLE

The "required water quantity" column in the Table denotes the amount of water that is required to produce a cement paste of standard consistency in percentage of the cement weight.

| Example | Required water quantity (%) | Compression strength, Mpa Curing Time Days | | | Porosity $cm^3/g$ |
|---|---|---|---|---|---|
| | | 1 | 7 | 28 | |
| 1 | 23.5 | 35.1 | 73.6 | 91.1 | 0.070 |
| 2 | 23.4 | 24.4 | 57.4 | 68.8 | 0.091 |
| 3 | 23.2 | 30.2 | 68.2 | 75.1 | 0.079 |
| 4 | 23.5 | 18.9 | 44.4 | 54.9 | 0.092 |
| 5 | 19.8 | 48.2 | 87.1 | 100.3 | 0.034 |
| 6 | 20.1 | 39.1 | 70.3 | 82.1 | 0.041 |
| 7 | 23.1 | 39.7 | 80.1 | 98.0 | 0.066 |
| 8 | 23.5 | 36.3 | 74.1 | 92.0 | 0.069 |

As is evident from the above Table, the cement paste produced in accordance with the inventive method has a greater mechanical strength and a reduced priority. The water requirement, however, is roughly the same.

It will therefore be evident that the present invention provides a Portland cement of considerably higher chemical reactivity than that of normal Portland cement, which is reflected in the fact that the cement paste cures more quickly at a given strength and obtains a significantly higher final strength.

Although the invention has been described above with reference to various examples and also with reference to various embodiments, it will be understood by the person skilled in this art that the aforesaid ratios relating to the compounds used can be modified with the aid of appropriate tests such as to obtain a cement that has the properties desired.

The aforesaid embodiments do not therefore restrict the scope of the present invention, since variations can be made within the scope of the following claims.

What is claimed is:

1. A method of treating cement clinker, said method comprising the steps of: providing cement clinker, and grinding said clinker in a tubular mill while adding water and gypsum, wherein the water added during grinding of the clinker has a pH of from about 9 to about 13.

2. A method according to claim 1, including the step of electrolyzing the water before addition to the mill to provide said water pH-value.

3. A method according to claim 1, including the step of adding during the grinding step an agent selected from the group consisting of microfill agents, water-reduction agents, and mixtures thereof.

4. A method according to claim 3, including the step of forming a slurry by mixing a part of an agent selected from the group consisting of microfill agents, water-reduction agents, and mixtures thereof with said water having said pH-value, and injecting the slurry into the mill during the grinding step together with a component in a dry state and selected from the group consisting of microfill agents, water-reduction agents, and mixtures thereof.

5. A method according to claim 4, wherein the ratio of dry component to slurry is between about 95 weight %: 5 weight % and about 85 weight %: 15 weight %.

6. A method according to claim 4, wherein the slurry has a liquid phase that exceeds 50% of the weight of said slurry.

7. A method according to claim 3, including the step of adding to the mill an $SiO_2$-containing microfill agent in an amount corresponding to up to about 80% of the combined weight of microfill agent, water-reduction agent and water.

8. A method according to claim 3, including the step of adding to the mill a polymer-containing water-reduction agent in an amount corresponding to about 5% of the combined weight of microfill agent, water-reduction agent and water.

9. A method according to claim 8, including the step of forming a slurry containing the water-reduction agents and electrolyzing the slurry to obtain said pH-value prior to adding the slurry into the tubular mill.

10. A method of treating cement clinker, said method comprising the steps of: providing cement clinker, and grinding said clinker in a tubular mill while adding water, gypsum and a water-reduction agent, wherein the water added during grinding of the clinker has a pH of from about 9 to about 13.

11. A method according to claim 10, including the step of electrolyzing the added water to provide said water pH-value.

12. A method according to claim 10, including the step of adding during the grinding step an agent selected from the group consisting of microfill agents, water-reduction agents, and mixtures thereof.

13. A method according to claim 12, including the step of forming a slurry by mixing a part of an agent selected from the group consisting of microfill agents, water-reduction agents, and mixtures thereof with said water having said pH-value, and injecting the slurry into the mill during the grinding step together with a component in a dry state and selected from the group consisting of microfill agents, water-reduction agents, and mixtures thereof.

14. A method according to claim 13, wherein the ratio of dry component to slurry is between about 95 weight %: 5 weight % and about 85 weight %: 15 weight %.

15. A method according to claim 7, wherein the $SiO_2$-containing microfill agent is selected from the group consisting of blast furnace slag, limestone, and mixtures thereof.

16. A method according to claim 8, wherein the polymer-containing water reduction agent is a lignosulfate-based polymer including an additive selected from the group consisting of naphthalene, melamine, and combinations thereof.

* * * * *